US010341350B2

(12) United States Patent
Lazarovitz et al.

(10) Patent No.: US 10,341,350 B2
(45) Date of Patent: *Jul. 2, 2019

(54) ACTIVELY IDENTIFYING AND NEUTRALIZING NETWORK HOT SPOTS

(71) Applicant: CyberArk Software Ltd., Petach-Tikva (IL)

(72) Inventors: Lavi Lazarovitz, Petach-Tikva (IL); Asaf Hecht, Petach-Tikva (IL)

(73) Assignee: CYBERARK SOFTWARE LTD., Petach-Tikva (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/948,940

(22) Filed: Apr. 9, 2018

(65) Prior Publication Data
US 2019/0166126 A1 May 30, 2019

Related U.S. Application Data

(63) Continuation of application No. 15/824,878, filed on Nov. 28, 2017.

(51) Int. Cl.
*H04L 29/06* (2006.01)
*H04L 12/26* (2006.01)
(Continued)

(52) U.S. Cl.
CPC .......... *H04L 63/10* (2013.01); *H04L 41/0893* (2013.01); *H04L 43/065* (2013.01);
(Continued)

(58) Field of Classification Search
CPC .... H04L 63/08; H04L 63/102; G06F 21/6218
(Continued)

(56) References Cited

U.S. PATENT DOCUMENTS 8,607,067 B1 * 12/2013 van Rensburg ..... H04L 63/0823
  713/189
8,776,175 B1   7/2014 Hermes
(Continued)

OTHER PUBLICATIONS

Securing Privileged Access Reference Material, available at https://docs.microsoft.com/en-us/windows-server/identity/securing-privileged-access/securing-privileged-access-reference-material.
(Continued)

*Primary Examiner* — Evans Desrosiers
(74) *Attorney, Agent, or Firm* — Finnegan, Henderson, Farabow, Garrett & Dunner LLP

(57) ABSTRACT

Disclosed embodiments include identifying a first identity having a first level of privileged network access, identifying a network resource that the first identity is communicating with, classifying the network resource as a network resource to be dynamically monitored, dynamically monitoring connections activity of the identified network resource to determine a second identity, wherein the second identity is determined based on it having a second level of privileged network access that is different from the first level of privileged network access and having attempted to establish a connection with the network resource, classifying, based on the determination of the second identity, the network resource as a potential source of privileged access escalation vulnerabilities, and performing, based on the classification that the network resource is a potential source of privileged access escalation vulnerabilities, at least one of: triggering an alert regarding the potential source of privileged access escalation vulnerabilities, performing a network security remediation operation for at least one of the first identity, the second identity, and the network resource, and identifying a plurality of other identities with levels of privileged network access different from the first level of privileged network
(Continued)

access and that have attempted to establish connections with the network resource.

18 Claims, 9 Drawing Sheets

(51) Int. Cl.
 *H04L 12/24* (2006.01)
 *H04W 12/12* (2009.01)
 *H04W 12/06* (2009.01)

(52) U.S. Cl.
 CPC .......... *H04L 63/08* (2013.01); *H04L 63/1425* (2013.01); *H04L 63/1433* (2013.01); *H04W 12/06* (2013.01); *H04W 12/12* (2013.01)

(58) Field of Classification Search
 USPC ............................................ 726/4
 See application file for complete search history.

(56) References Cited

U.S. PATENT DOCUMENTS

| | | |
|---|---|---|
| 2001/0044827 A1* | 11/2001 | Zhuk ...................... G06N 5/043 709/205 |
| 2007/0018276 A1 | 1/2007 | Itou |
| 2007/0218874 A1 | 9/2007 | Sinha et al. |
| 2009/0276853 A1 | 11/2009 | Govindavajhala |
| 2011/0131651 A1 | 6/2011 | Shanmugavadivel et al. |
| 2016/0164904 A1* | 6/2016 | Alamuri .............. H04L 63/1433 726/25 |

OTHER PUBLICATIONS

Extended European Search Report for corresponding EP Application No. 17205216.9 dated Mar. 7, 2018.
Patrick Jungles et al: "Mitigating Pass-the-Hash (PtH) Attacks and Other Credential Theft Techniques", Jan. 1, 2012 (Jan. 1, 2012), XP055452634, [retrieved on Feb. 20, 2018].

* cited by examiner

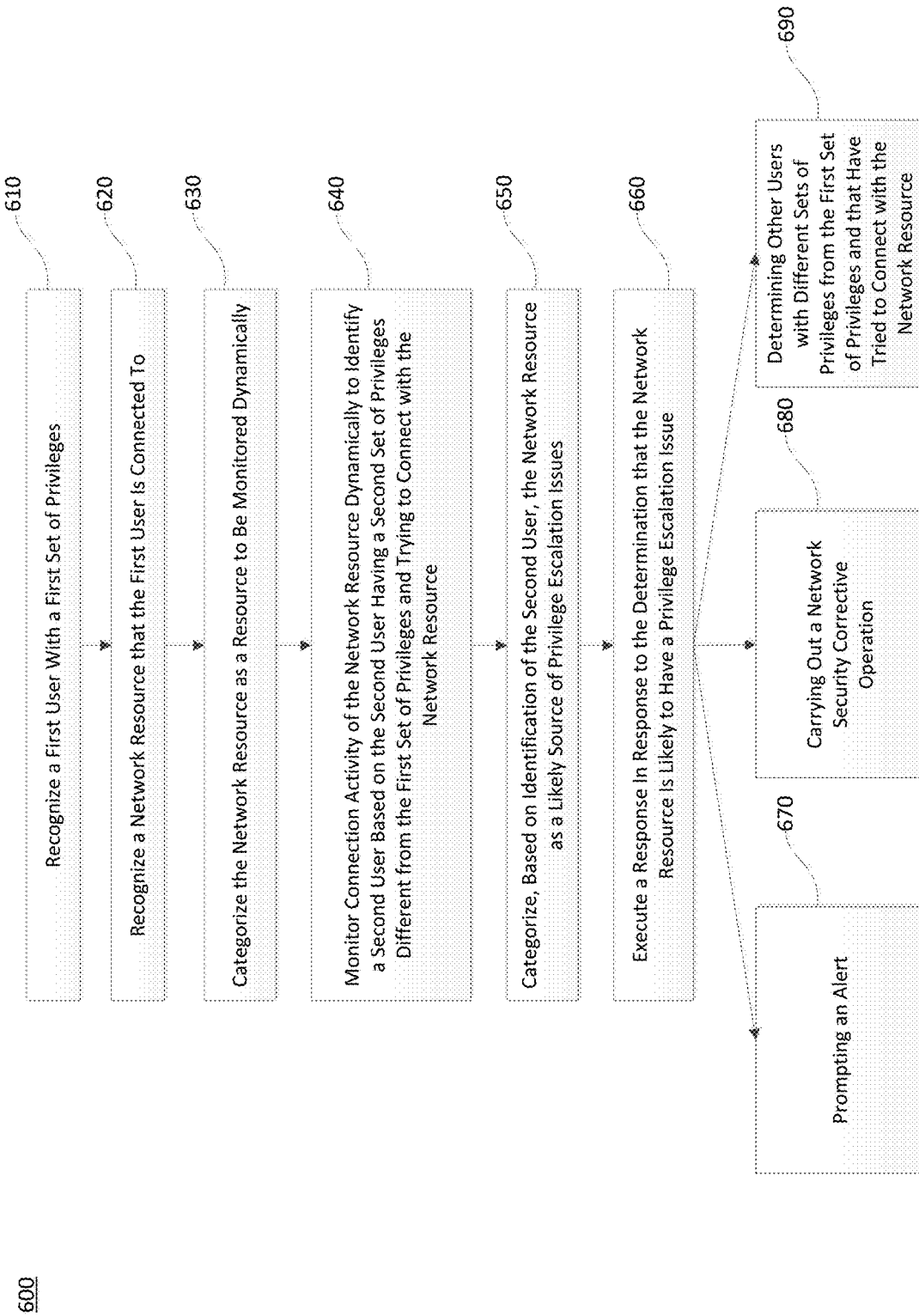

ACTIVELY IDENTIFYING AND NEUTRALIZING NETWORK HOT SPOTS

This application is a continuation of U.S. patent application Ser. No. 15/824,878, filed on Nov. 28, 2017, the entire contents of which are incorporated herein by reference.

BACKGROUND

Many organizations struggle with identifying authentication theft incidents over their networks. These organizations likewise have difficulty detecting "hot spots," which are machines where authentication theft may occur. Specifically, hot spots are machines that allow attackers to extract information and escalate their privileges using the extracted information or properties of the machine, including, credentials, host IP, signature, or time of day, etc. Hotspots either have exposed, or currently are exposing, privileged accounts to authentication theft.

In order to move vertically and climb to "higher" assets in terms of sensitivity or privileged access rights, an attacker can compromise the account of one of higher privileges, for example, an account of a high power user like an administrator. For instance, the hot spot machine can allow connections from both medium and highly privileged accounts. If an attacker is able to escalate their privileges using an administrator's privileges, or by use of properties of the machine, the attacker may access other network resources, thus potentially expanding their freedom of movement throughout the network and compromising more of the network.

If attackers are able to escalate their privileges using an administrator's privileges, the attackers may possibly take control of an organization's IT infrastructure, disable security controls, steal confidential information, commit financial fraud, and otherwise disrupt operations. Privilege escalation is used in many network security breaches today, in both on-premises networks and in cloud environments.

Current systems attempt to avoid creation of hot spots using layered network architectures and network segmentation. Some tools allow organizations to draw attack vectors based on use of privileged credentials. Some existing approaches for collecting network information and identifying hot spots include: BloodHound, Cyberark DNA®, PowerView, and PingCastle. However, tools like Blood-Hound, for example, are static, one-time execution tools that do not account for the dynamic nature of organizational networks and privilege escalation. Moreover, tools like BloodHound do not allow for any action once a risk is recognized.

Similarly, the tier doctrine guides organizations to segregate network access based on sensitivity or privileged tiers. For example, an administrator account with local administrator access to Tier 1 assets, should not have access to tier 0 or tier 2 assets. If such access is possible, privileged accounts from another tier might be able to compromise the administrator account, on a hotspot to which they are both connected, and use the administrator account's privileges to take over another tier of the network. Accordingly, eliminating hot spots by creating secure work flows based on the tier doctrine, may help organizations reduce future risks and contain a machine compromise to a tier compromise (i.e., not a full network compromise). Nevertheless, it can be restrictive and to an organization to establish such secure work flows, and if there are exceptions to the work flows the problems of hot spots remain significant.

It would be advantageous, therefore, to mitigate privileged escalation techniques by identifying possible locations in a network that are prone or exposed to attacks, which use privileged or sensitive accounts in order to perform escalation. There is thus a need for technological solutions for actively identifying network resources that have privileged access escalation vulnerabilities.

SUMMARY

The disclosed embodiments describe non-transitory computer readable mediums and methods for actively identifying network resources that have privileged access escalation vulnerabilities. For example, in an exemplary embodiment, there may be a non-transitory computer readable medium including instructions that, when executed by at least one processor, cause the at least one processor to perform operations for actively identifying network resources that have privileged access escalation vulnerabilities. The operations may comprise identifying a first identity having a first level of privileged network access, identifying a network resource that the first identity is communicating with, classifying the network resource as a network resource to be dynamically monitored, dynamically monitoring connections activity of the identified network resource to determine a second identity, wherein the second identity is determined based on it having a second level of privileged network access that is different from the first level of privileged network access and having attempted to establish a connection with the network resource, classifying, based on the determination of the second identity, the network resource as a potential source of privileged access escalation vulnerabilities, and performing, based on the classification that the network resource is a potential source of privileged access escalation vulnerabilities, at least one of triggering an alert regarding the potential source of privileged access escalation vulnerabilities, performing a network security remediation operation for at least one of the first identity, the second identity, and the network resource, and identifying a plurality of other identities with levels of privileged network access different from the first level of privileged network access and that have attempted to establish connections with the network resource.

According to a disclosed embodiment, the first identity is identified based on a domain administrator group.

According to a disclosed embodiment, the first identity is identified based on an ability of the first identity to change passwords of other identities.

According to a disclosed embodiment, the first identity is identified based on an inspection of network application data traffic.

According to a disclosed embodiment, the first identity is identified based on an inspection of network authentication traffic.

According to a disclosed embodiment, the network security remediation operation includes rotating a password associated with at least one of the first identity and the second identity.

According to a disclosed embodiment, the network security remediation operation includes terminating a network session between the network resource and at least one of the first identity and the second identity.

According to a disclosed embodiment, the processor is further configured to perform a further network security remediation operation for the plurality of other identities.

According to another disclosed embodiment, the first identity is a local computer system account.

According to another disclosed embodiment, the first identity is a network account.

According to another disclosed embodiment, the first identity is an instance of a virtual computing resource.

According to another disclosed embodiment, the first identity is a token.

According to another disclosed embodiment, the alert identifies the network resource and privileged access escalation vulnerabilities.

According to another disclosed embodiment, the plurality of other identities are identified based on having active connections to the network resource.

According to another disclosed embodiment, the plurality of other identities are identified based on having attempted to connect to other network resources that are also classified as potential sources of privileged access escalation vulnerabilities.

According to another disclosed embodiment, the first level of privileged network access and second level of privileged network access are based on different network security group memberships.

According to another disclosed embodiment, the first level of privileged network access and second level of privileged network access are based on different network security tiers within a multi-tier network security framework.

According to a further disclosed embodiment, a method may be implemented for actively identifying network resources that have privileged access escalation vulnerabilities. The method may comprise identifying a first identity having a first level of privileged network access, identifying a network resource that the first identity is communicating with, classifying the network resource as a network resource to be dynamically monitored, dynamically monitoring connections activity of the identified network resource to determine a second identity, wherein the second identity is determined based on it having a second level of privileged network access that is different from the first level of privileged network access and having attempted to establish a connection with the network resource, classifying, based on the determination of the second identity, the network resource as a potential source of privileged access escalation vulnerabilities, and performing, based on the classification that the network resource is a potential source of privileged access escalation vulnerabilities, at least one of triggering an alert regarding the potential source of privileged access escalation vulnerabilities, performing a network security remediation operation for at least one of the first identity, the second identity, and the network resource, and identifying a plurality of other identities with levels of privileged network access different from the first level of privileged network access and that have attempted to establish connections with the network resource.

According to a further disclosed embodiment, the network security remediation operation includes rotating a password associated with at least one of the first identity and the second identity.

According to another disclosed embodiment, the method may include performing a further network security remediation operation for the plurality of other identities.

According to a further disclosed embodiment, the plurality of other identities are identified based on having attempted to connect to other network resources that are also classified as potential sources of privileged access escalation vulnerabilities.

According to another disclosed embodiment, the first level of privileged network access and second level of privileged network access are based on different network security group memberships.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIG. 6 is a flowchart depicting an example process for identifying and responding to network resources that have privileged access escalation vulnerabilities, in accordance with disclosed embodiments.

DETAILED DESCRIPTION

Figure 1:
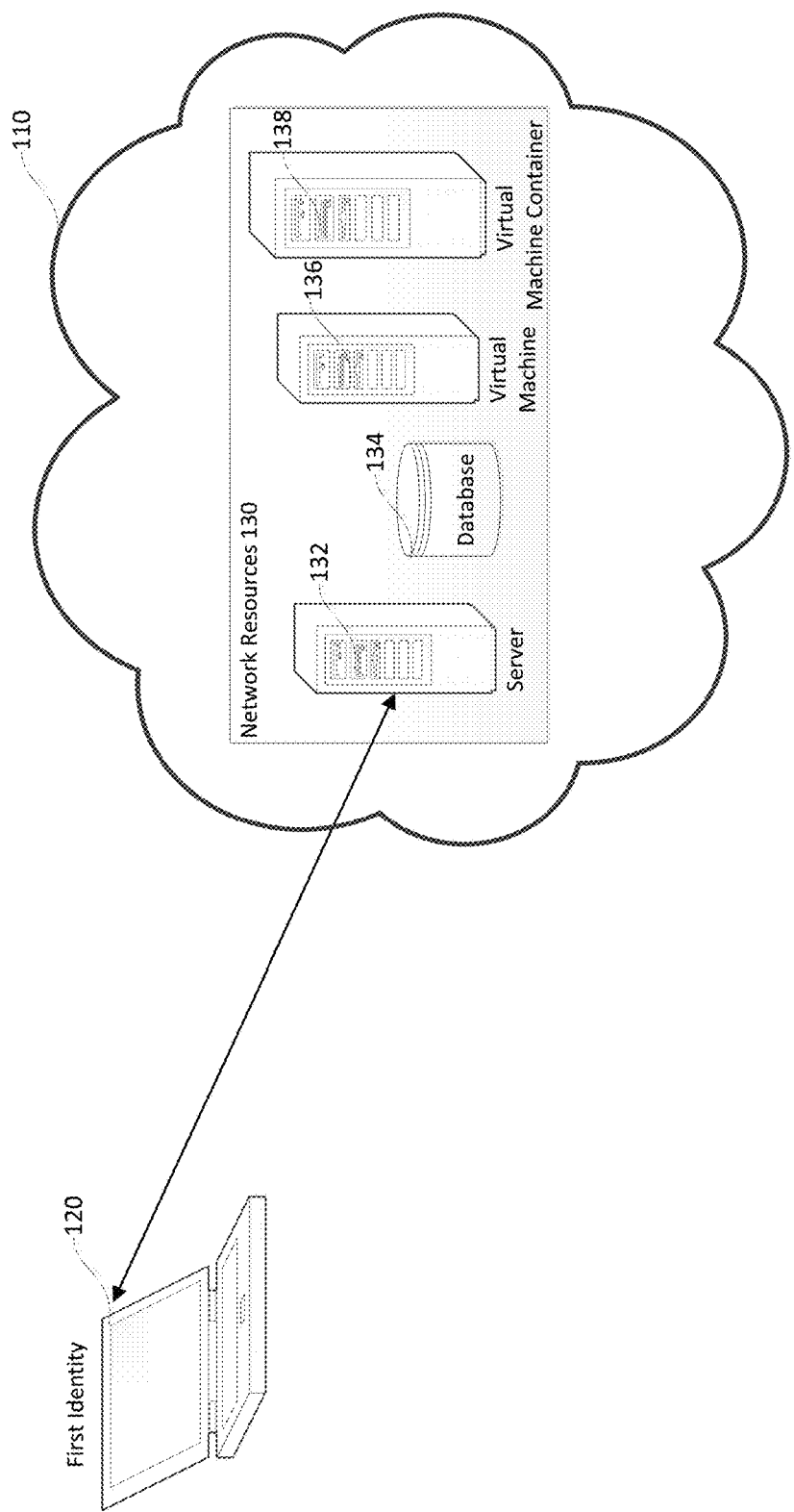
FIG. 1 is a block diagram of an example system including a first identity, in accordance with disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

As disclosed herein, computer or network identities may attempt to communicate with network resources. An identity may be, for example, a local account on a computer or computer system. The account may be established according to a particular operating system (e.g., Microsoft Windows®, Mac OS®, UNIX, etc.), a particular security service, or another service or protocol governing the computer or computer system. An identity may also be a network account. Such an identity may be established according to a network operating system (e.g., a Microsoft® network operating system, a Cisco® network operating system, a Dell® network operating system, a Linux network operating system, etc.). Further, network account identities may be established based on network security protocols or services. In addition, an identity may be an instance of a virtual machine or container running in a cloud computing environment. The identity may also be a token used to identify a particular computing resource, person, account, virtual machine, container, or other entity accessing a computer or network.

In the disclosed embodiments, a network resource may be configured for communication with computers or network identities. As disclosed herein, a network resource may be any of numerous types of devices with data processing and network communications capabilities. Examples include servers, desktop computers, cloud-computing virtual machines or containers, laptops, smartphones, tablets, personal digital assistants, enterprise digital assistants, smart cards, smart watches, smart bands, smart headphones, computer-embedded clothing, car-computers and other in-vehicle computer equipment, Internet-of-Things (IoT) devices, and any other device with data processing and network connectivity capabilities.

In the disclosed embodiments, privileged network access refers to any network resource to which access is limited by software-based restrictions. Access may be limited, for example, through the requirement that some privileged credential (e.g., password, SSH key, symmetric (e.g., public/private) key, and other type of cryptographic data or privileged access token) be provided and verified before access to the privileged resource is permitted. Examples of resources that may have requirements of privileged network access include SQL servers, databases holding confidential information, restricted-use applications, virtual machines, virtual machine containers, operating system directory services (e.g., Microsoft Active Directory™) access-restricted cloud-computing resources (e.g., orchestrator software), sensitive IoT equipment (e.g., electricity or other utility equipment, physical access control devices, video surveillance equipment, etc.), and any other computer-based equipment or software accessible to a limited group of users on a network. As disclosed here, privileged network access may be based on different levels or tiers of privileged rights. Some accounts (e.g., administrator or root accounts) may have higher sets of rights than ordinary accounts.

In accordance with the disclosed embodiments, privileged access escalation vulnerabilities refer to the potential for an identity to obtain a higher level of privileged network access than that to which they are entitled. For example, privileged access escalation vulnerabilities may exist where an attacker with no privileged network access or a low level of privileged network access is able to obtain higher or stronger privileged network access. As discussed further below, privileged access escalation vulnerabilities may be detected and responded to in various ways.

As described further herein, cold spots are machines in a network that host a privileged account but are not presently vulnerable to an attacker exploiting the privileged account to elevate their own privileges. As soon as an identity with different privileges than those of the privileged account (e.g., a less privileged account or more privileged account) connects to the cold spot, the cold spot is transformed into hot spot, a machine that currently allows an attacker to escalate privileges. There are several ways by which an attacker may attempt to elevate their privileges to those of another identity connected to a hot spot. For example, an attacker can escalate privileges using a Pass-The-Hash technique, where an attacker steals account credentials from one machine, and uses them to authenticate to other machines or resources in a network. Pass-the-Hash attacks involve attackers authenticating themselves using password hashes, which allow the attackers to impersonate authenticated identities without ever knowing the identities' actual passwords or other credentials in plaintext. Privileged access escalation on hot spots may also be accomplished using abuse of trust and delegation, exploitation of vulnerable services, abuse of Account Access Lists or attributes, and through other techniques.

In some scenarios, for example, if an identity with strong privileges (e.g., an administrator or root account) connects to a network resource such as a server or database, their privileged credentials are used, and temporarily stored, on the server or database at the time of connection. If the identity is the only identity connected to the server or database, or each identity that is connected has the same level of privileged access, the server or database is a cold spot. If other identities of the same privilege level or tier are connected to the same server or database, the server or database is still a cold spot. However, once an identity with a different level or tier of privileged access (either higher or lower) connects to the server or database, they may be able to gain the strong privileges of the identity. Thus, the server or database would become a hot spot because it would be a source for an attacker to potentially escalate their privileges using the strong privileges of the identity.

Reference will now be made in detail to the disclosed embodiments, examples of which are illustrated in the accompanying drawings.

FIG. 1 is a block diagram of an example system including a first identity. As shown, system 100 includes a first identity 120 connecting to one or more of the network resources 130 over network 110. Network resources 130 may include a variety of resources, such as a server 132, database 134, virtual machine 136, virtual machine container 138, etc. Such network resources may be deployed in a local area network or other on-premises network, or in a cloud environment (e.g., as provided by Amazon Web Services®, Microsoft Azure®, IBM Cloud®, etc.), or in a combination thereof. In different embodiments, the first identity 120 may connect to any of server 132, database 134, virtual machine 136, and virtual machine container 138. In further embodiments, the first identity 120 may connect to local resources (e.g., resources stored or running on the same computer or computer system on which the first identity 120 is running). Such local resources may be similar to network resources 130. For example, if the first identity is a local Microsoft® or Unix account on a computer system, the account may attempt to communicate with other resources on the same computer system (e.g., an access-restricted business database, an administrator portal, a financial services application, etc.).

In addition to the examples of a server, database, virtual machine, and virtual machine container shown in FIG. 1, a variety of other types of network resources are possible too, for example, SQL servers, databases holding confidential information, restricted-use applications, operating system directory services (e.g., Microsoft Active Directory™), access-restricted cloud-computing resources (e.g., orchestrator software), sensitive IoT equipment (e.g., electricity or other utility equipment, physical access control devices, video surveillance equipment, etc.), and any other computer-based equipment or software accessible to a limited group of users on a network.

Network resources 130 may be privileged resources. Thus, network resources 130 may be any network resource to which access is limited, such as through a requirement that some privileged credential (e.g., password, SSH key, symmetric (e.g., public/private) key, or other type of cryptographic data or privileged access token) be provided and verified before access to the privileged resource is permitted. As described further below, access may be restricted in a variety of ways, such as through privileged access tiers, administrator groups, or other access restrictions.

First identity 120 may connect to a network resource 130 via various types of computing devices, such as a computer, mobile device, or IoT device. A variety of other types of computer devices are possible too, such as tablets, personal digital assistants, enterprise digital assistants, smart cards, smart watches, smart bands, smart headphones, computer-embedded clothing, car-computers and other in-vehicle computer equipment, or any other device with data processing and network connectivity capabilities. In various embodiments, the computing device on which the first identity 120 is operating may have one or more local or network accounts that are associated with the identity, with applications installed on the computing device, or with users who use the computing device.

In some embodiments, first identity 120 may have privileged access to one or more of the network resources 130. In other embodiments, first identity 120 may lack such privileged access.

Network 110 may be an on-premises network (e.g., local area network), a cloud network (e.g., private cloud, public cloud, or hybrid cloud network), or a combination of these types of networks. Although FIG. 1 depicts first identity 120 as separate from the network 110 in which network resources 130 are located, in certain embodiments first identity 120 and yet other devices may be located in the same network, each may be located in a different network, or they may be located in overlapping networks.

The system configuration illustrated in FIG. 1 is an example configuration depicting general aspects of disclosed embodiments. A discussion of techniques and processes for identifying network resources 130 that have privileged access escalation vulnerabilities follows with respect to FIGS. 2-6. While certain aspects of the techniques refer to the elements shown in FIG. 1, the disclosed processes are not limited to the particular configuration illustrated in FIG. 1. While various modifications to the general configuration of system 100 are detailed in this disclosure, other modifications are contemplated even if not specifically described. It is noted, for example, that the general principles of the disclosed embodiments are not tied to any specific infrastructure. The disclosed systems are operable within any on-premises or cloud implementation, known and yet to be known in the art.

Figure 2:
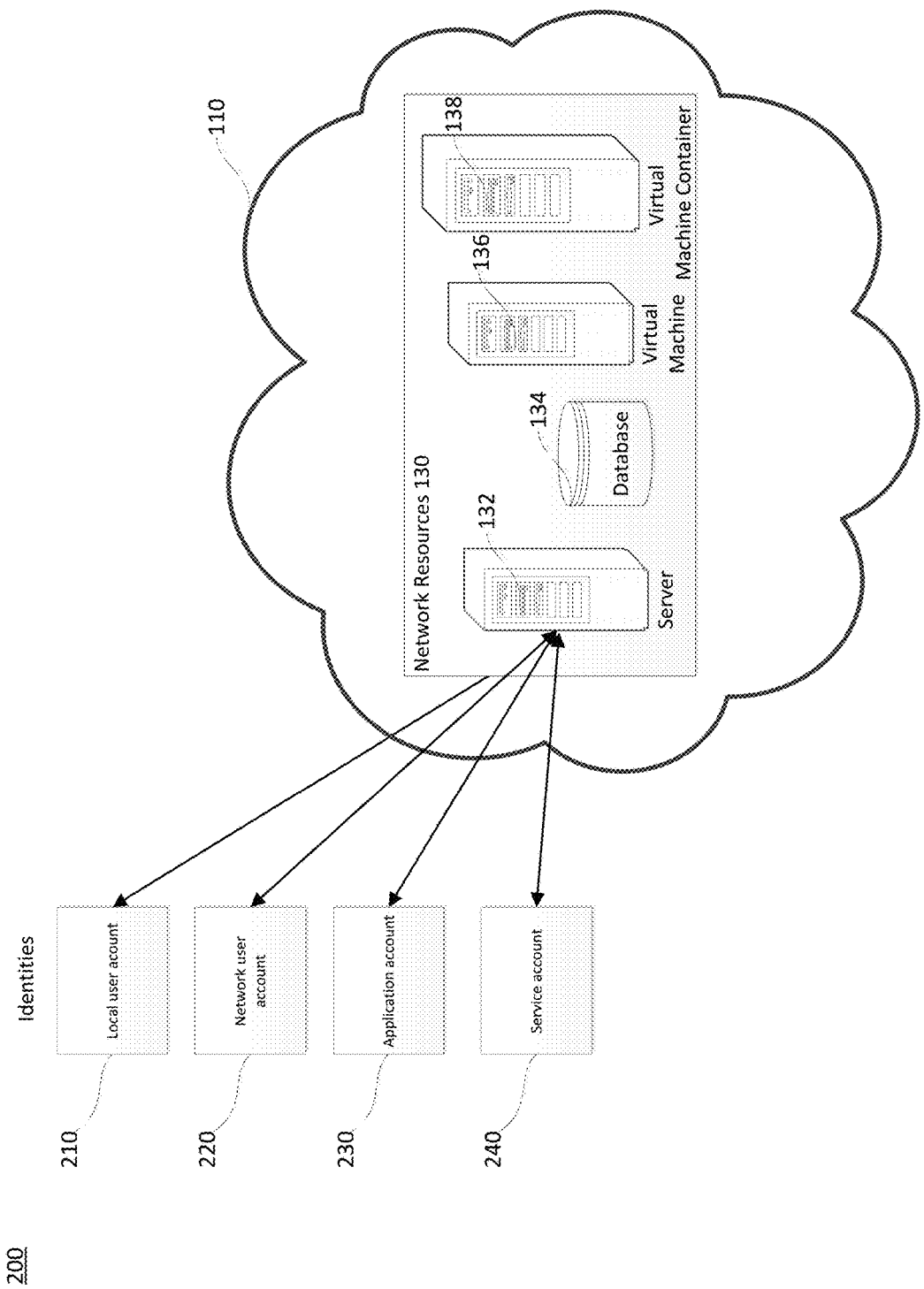
FIG. 2 is a block diagram of an example system including several different types of first identities, in accordance with disclosed embodiments.

FIG. 2 is a block diagram of an exemplary system including alternative first identities. First identity 120 of FIG. 1 may be any account or computing instance with at least some level or tier of privileged network access. As shown, system 200 includes various identities connecting to network resources 130, as described above with regard to FIG. 1. In various embodiments, identities may include local user account 210, network user account 220, application account 230, and service account 240. Local user account 210 may be a user account within a local operating system environment, such as a personal computer Microsoft® or Apple® operating system. Network user account 220 may be a network account established according to a network operating system, as discussed above. Application account 230 may be the account associated with a particular software program that operates in a local or network environment, which has fully or partially autonomous functionality, as opposed to a user account. An example would be a cyber-security application has at least some autonomous functionality (e.g., intercepting communications, performing risk analysis, etc.). Service account 240 may be a local account used by a service control manager (e.g., super user, or root account) and having a high level of privileged access.

In some embodiments, local user account 210, network user account 220, application account 230, and service account 240, may have privileged access to any one or more of the network resources 130. In systems with different tiers of privileged access or different administrator access groups, for example, each of accounts 210-240 may have different levels of privileged access. As described above, in embodiments where network resources are local resources, they may be located on the computing device hosting the account or identity. In some embodiments, the first identity may be a local computer system account, a network account, an instance of a virtual computing resource, or a token.

In further embodiments, there may be a plurality of different classes, tiers, or categories of identities, with each class, tier, or category allowing access to different classes, tiers, or categories of privileged resources. For example, while an administrator or root account may have strong privileged access (e.g., access to most of not all privileged resources and privileged functions), other accounts may have weaker privileged access or none at all. The classes, tiers, and categories of privileged access may be regulated by administrators, root accounts, or external network security providers.

In some embodiments, there may be segregation of privileges, for example, segregating access by different identities to specific sets of network resources, or limiting access by utilizing a network security policy from which each service derives its own policy. As an example, one class of network administrator may have privileges extending to an enterprise's on-premises network, while a different class of network administrator may have access to both the on-premises network and also an associated cloud environment. In some situations, this may involve creating classes of accounts for different tiers of access. In further situations, an identity may be split into different corresponding identities for different tiers, such as user1_endpoint and user1_server. Accordingly, when the user1 accesses the endpoint tier, the user1 can use the dedicated endpoint account and not expose the server tier credentials and assets.

In other embodiments, there may be segregation of privileges by network segregation, for example, limiting network access by a firewall to limit any access from the endpoint tier to the server tier. As a result, accounts from different tiers may not be able to cross-connect. Also, if a server account connects physically to the endpoint tier, it cannot be used to connect to the server tier.

In yet other embodiments, there may be segregation of on demand privileges. This may involve making all accounts non-privileged by default. Upon an access attempt to a network resource, a central system, like an identity provider or the service itself, may assign the needed privileges to the identity if all applicable security conditions are met (e.g., source of connection is authenticated, recent activity of the user is non-malicious, type of authentication used is satisfactory, etc.). Once the identity no longer needs the on-demand privileged access, the access may be withdrawn (e.g., the central system may withdraw, revoke, or nullify the privileges).

Figure 3:
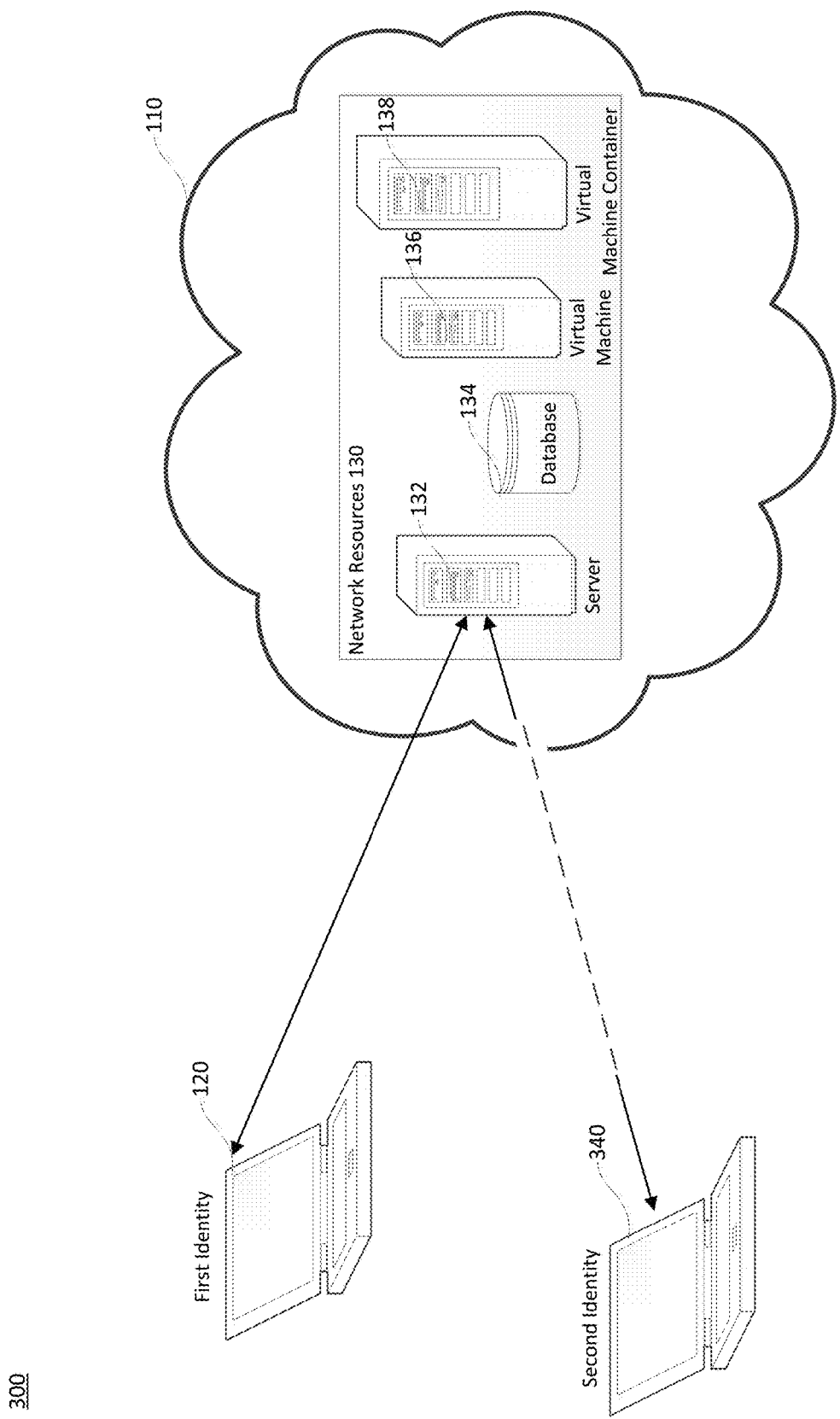
FIG. 3 is a block diagram of an example system including a first identity and a second identity, in accordance with disclosed embodiments.

FIG. 3 illustrates an exemplary system including a first identity and a second identity connecting to a network resource among network resources 130. As shown, system 300 includes first identity 120 connecting to one or more network resources 130. System 300 further includes second identity 340, which is attempting to connect to one or more network resources 130. Second identity 340 has a different set of privileges than that of first identity 120 of FIGS. 1 and 3. In some embodiments there may be different groups of privileges, for example, different administrator groups, or different customized groups within each group with different levels of privileges.

In one embodiment, for instance, a first account may have full control over the network resources and identities. In a Unix environment, for example, the first account may be a "superuser." In a Microsoft® environment, it may be an administrator account with privileges over all other administrator accounts (e.g., governing the creation and deletion of other administrator accounts). A second account may have lesser privileges than the first account, such as only local privileges to manage the security policies and configurations in a portion of the network, or only privileges over certain types of network resources (e.g., those relating to a payroll department but not an engineering department).

In another embodiment, a first account may be a service account that is trusted to impersonate any user in the domain. This may involve, for example, pulling emails for a user, retrieving health information, accessing financial information, etc. A second account may be, for example, a user account that has privileges to connect remotely and manage the service host.

In yet another embodiment, a first account may be a host account with privileges to manage a privileged group of accounts (e.g., administrator accounts). For example, the first account may have authority to add accounts and change privileges among the group of accounts. A second account may be an account with privileges to manage configurations and policies over all endpoints (one of which is the first (host) account). In further embodiments, various other identities with differing levels of privileged access may attempt to connect to network resources 130, either in addition to or instead of first identity 120 and second identity 340.

In some embodiments, second identity 340 may be attempting to connect to one or more network resources 130. When this happens, the network resource 130 (e.g., server 132) transforms from a cold spot to a hot spot if a connection of an identity with different privileges is identified. For example, if first identity 120 and second identity 340 have different levels of privileged access, and both are connected to (or attempting to connect to) the same server 132, the result is that server 132 is a hot spot. In that situation, server 132 is a hot spot because second identity 340 may thereby attempt to escalate its privileges to those of first identity 120 using the hot spot, e.g., server 132. For example, when the first identity 120 accesses the server 132 in a privileged manner, server 132 may temporarily store privileged access credentials associated with the first identity 120. When this happens, second identity 340 may attempt to copy or otherwise steal the privileged access credentials from the server 132 and use them itself, thereby obtaining the privileged access rights of the first identity. In other embodiments, second identity 340 may attempt to escalate its privileges by gaining access to server 132 based on properties of first identity 120's identity, (e.g. it's host IP, signature, or time of day).

FIG. 4 is an exemplary flowchart showing a process for identifying and responding to network resources that have privileged access escalation vulnerabilities. In accordance with above embodiments, process 400 may be implemented in systems 100, 200, or 300. For example, process 400 may be performed by an application running on the computing device that hosts the identity 120 or the network resource 130. Process 400 may also be performed by a micro agent application running transparently on such a computing device, such that the micro agent application runs without a user of the computing device observing the micro agent application. Alternatively, process 400 may be implemented at an intermediary server between the identities and the network resources. Further, process 400 may be implemented on network resources themselves. In some embodiments, the application or micro agent may be configured to monitor the connections activity between identities (e.g., 120) and network resources 130. The application or micro agent may also create historical logs identifying when identities were connected to the network resources 130, including identifying information about the identities (e.g., account name, credentials, IP address, MAC address, time of day, tokens, signatures, hashes, etc.). Such historical logs may be useful, in the event a hot spot is identified, in order to identify potential privileged access escalations that have occurred among different identities.

As discussed above, in some embodiments a network resource may be considered a hot spot if two identities are connected (or attempting to connect) to the network resource and they have differing levels of privileged access. For instance, in a given network an administrator or other high power user may connect to a SQL database in order to perform a function (e.g., add records to the database, edit data, etc.). When that happens, the administrator's or other high power user's privileged credentials are used, and at least temporarily stored, on the database at the time of connection. If the administrator is the only identity connected to the database, or each identity that is connected has the same level of privileged access, the database is typically considered a cold spot. Thus, if other identities of the same privilege level or tier are connected to the same database, the database is still considered a cold spot. None of the identities would be able to escalate their privileged access by stealing or copying each other's privileged access rights. However, once an identity with a different level or tier of privileged access (either higher or lower) connects to the database, the possibility of privileged access escalation arises. In particular, the identity having lower privileges may be able to steal or copy the administrator's authentication information (e.g., password, certificate, token, hash, data representing biometric information, etc.). Such escalation may be applicable, for example, if the authentication information (e.g., password, certificate, token, hash, data representing biometric information, etc.) is locally or temporarily stored on the database. In such case, the connecting identity with lower privileges may be able to use the authentication information to gain control of an organization's IT infrastructure, expand their freedom of movement throughout the network, and compromise more of the network. Thus, the database would become a hot spot because it would be a source for an attacker to potentially escalate their privileges using the administrator's privileges.

Another way to identify a cold spot or hot spot is to proactively query end points (e.g., network resources) for current open sessions with privileged identities connected to them. The proactive scan or query may be performed using tools such as CyberArk DNA®, Microsoft Active Directory®, and others, which identify particular network resources and their status as privileged or non-privileged. In addition, end points may be continuously or periodically queried for identities connected to them. End points may be resources such as servers, databases, virtual machines, containers, and other machines or instances, as discussed above. Upon querying the end points, the end points may report back on the identities connected to them, and the identities may then be analyzed to determine their privileged access level. This may involve, for example, verifying whether they are a member of a privileged access group (e.g., a defined administrator group), checking a list or registry identifying their specific privileged rights in the network, determining what tier of a tiered network architecture they belong to, etc. As described above, if only one identity is connected, or only identities with the same privileged access level are connected, the end point may be classified as a cold spot. When another identity connects to the end point with a different level of privileged access, the end point may be reclassified as a hot spot.

After starting process 400 at step 401, as discussed above, in an operation 410 the system (e.g., using a processor executing specialized instructions) may determine if privileged credentials are being used on the network resource. For example, the system may identify whether first identity 120 of FIG. 1 is connected to and/or communicating with any of network resources 130. If privileged credentials are being used on the network resource, process 400 may continue to operation 420, in which the network resource is identified as a cold spot. As discussed above, a network resource is a cold spot if the network resource is not presently capable of allowing privileged escalation, but potentially could be in the future. However, if privileged credentials are not being used on the network resource, process 400 may cycle back to operation 410 to determine if privileged credentials are being used on the network resource. Process 400 may cycle back in that manner immediately or periodically. Upon such a cycling back, process 410 may occur either immediately or upon a predetermined timer period.

In an operation 430, the system (e.g., using a processor and specialized programming) may determine if the network resource is capable of allowing privileged escalation. For example, with reference to FIG. 3, second identity 340 has a different level of privileges than first identity 120. In some embodiments, first identity 120 may be an administrator connected to server 132 and second identity 340 may be an attacker connected to the same server 132. The server 132 may be a source for the attacker to escalate its privileges using the administrator's privileges. If the network resource is capable of allowing privileged escalation (i.e., two users of different levels of privileges are connected to the same network resource), process 400 may continue to operation 440, in which the network resource is identified as a hot spot. As discussed above, a network resource is a hot spot if the network resource is capable of allowing privileged escalation. However, if the network resource is not capable of allowing privileged escalation, process 400 may cycle back to operation 410 to determine if privileged credentials are being used on the network resource. Alternatively, if the network resource is not capable of allowing privileged escalation, process 400 may cycle back to operation 430 to again query whether the network resource is capable of allowing privileged escalation. Either form of cycling back may be instantaneous or occur according to a predetermined time interval. Thus, process 400 involves actively monitoring network resources to identify potential hot spots.

In response to operation 440 determining that a network resource is a hot spot, the system (e.g., using a processor with specialized programming) may perform various different operations before ending process 400 in step 499. The system may, in operation 450, trigger an alert. For example, an alert may identify the first identity or the second identity. The alert may also identify prior activity of the first identity or second identity, which can be used in a forensics analysis or further network investigations. In some embodiments, the alert may identify the network resource (e.g., by IP address, MAC address, name, administrator, or other identifying or descriptive information) and the privileged access escalation vulnerabilities (e.g., what identities are potentially compromised, what further identities may be compromised, etc.).

In some embodiments, the system may in an operation 460 perform a network security remediation operation. This may include, for example, rotating or deactivating a password associated with at least one of the first identity and the second identity. In some embodiments, the first and second level of privileged network access may be based on different network security group memberships or different network security tiers within a multi-tier network security framework. In some embodiments, a processor may perform a network security remediation operation for a plurality of other identities, for example, those who have attempted to connect to other network resources that are also classified as potential sources of privileged access escalation vulnerabilities. Further, the security remediation operation may involve monitoring the first identity or second identity to ascertain their past or future actions in the network (e.g., resources accessed, data transferred, network changes made, etc.).

In some embodiments, the system may in an operation 470 identify other identities that have attempted to establish connections with the network resource. For example, once it is determined that a network resource is a hot spot, it may effective to identify all other identities that were also connected to the hot spot. Such other identities may also be potential attackers or may be sources of privileged credential theft. Knowing what other identities are connected to the hot spot may thus help identify and control both potential attacks and further privilege escalation activity.

In some embodiments, process 400 does not end in step 499, but instead loops back to a previous operation (e.g., 401, 410, or 430). In this way, process 400 may continue to actively investigate a network for potential hot spots and privileged access escalation risks.

Figure 4A:
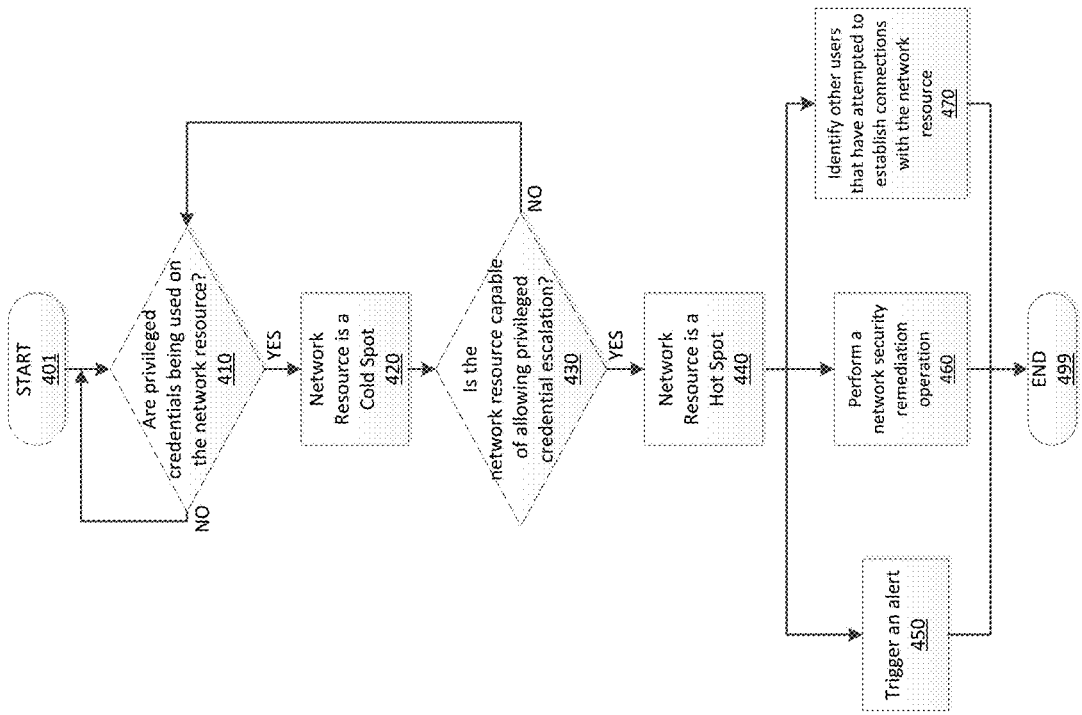
FIG. 4A is a flowchart depicting an example process for identifying and responding to network resources that have privileged access escalation vulnerabilities, in accordance with disclosed embodiments.
Figure 4B:
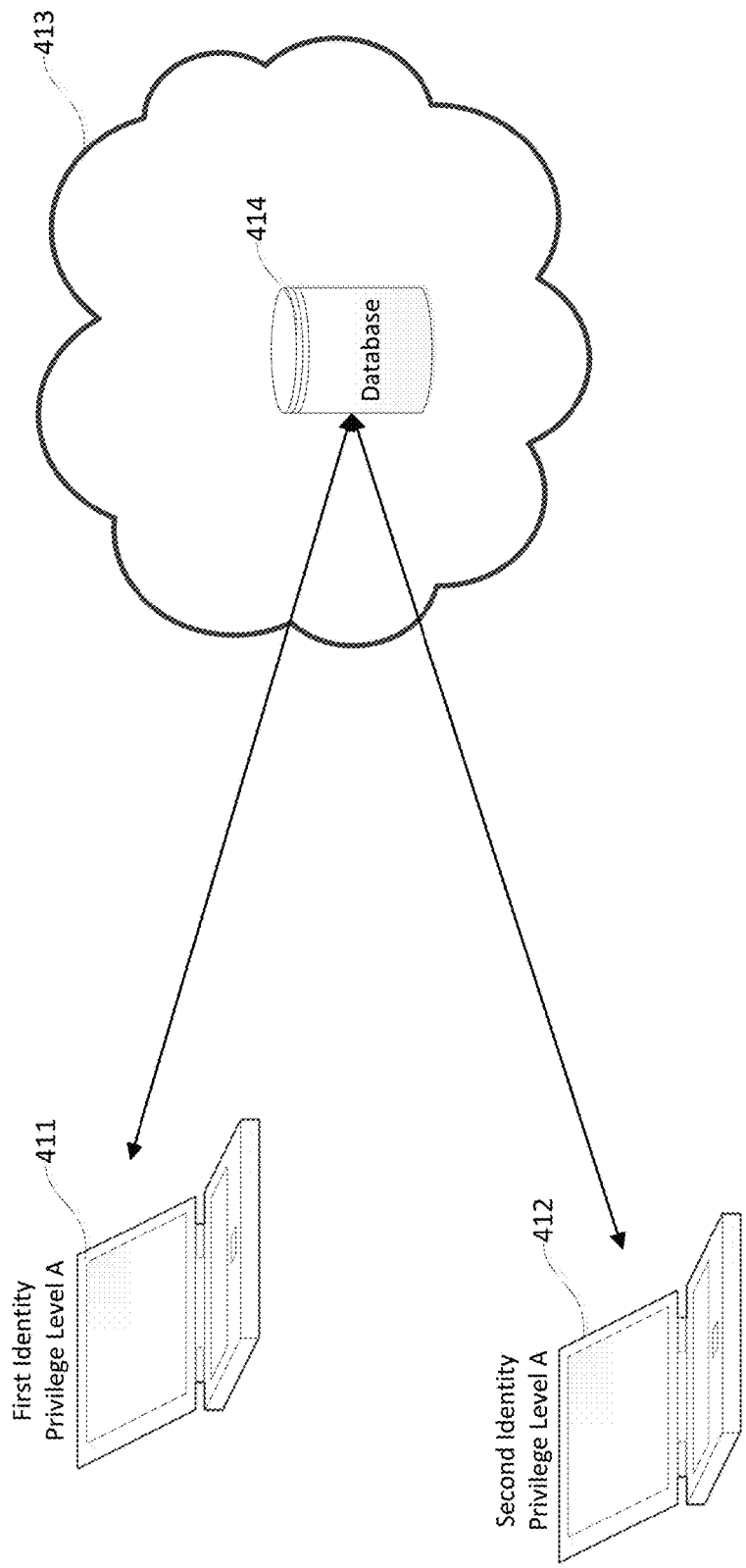
FIG. 4B is a block diagram of an exemplary system including identities with the same privilege level connecting to a network resource, in accordance with disclosed embodiments.

FIG. 4B illustrates an exemplary system of identities (411, 412) connecting to a network resource (414). As illustrated, FIG. 4B includes first identity 411 connecting to a network resource, which is database 414, over network 413. As discussed above, database 414 may be locally hosted on a computing system or may be a network resource (in an on-premises or cloud environment). First identity 411 may, potentially, need to authenticate itself as a privileged identity before obtaining access to database 414. FIG. 4B further includes second identity 412 similarly connecting to database 414 over network 413. In this example, first identity 411 and second identity 412 have the same level of privilege (i.e., privilege level A). This may be because first identity 411 and second identity 412 are administrator "peers" in the same administrator group, or within the same network tier. Accordingly, in this example the network resource, database 414, is considered to be a cold spot and does not transform to a hot spot. In this example neither first identity 411 nor second identity 412 can escalate their privileged access by stealing or copying information from each other.

Figure 4C:
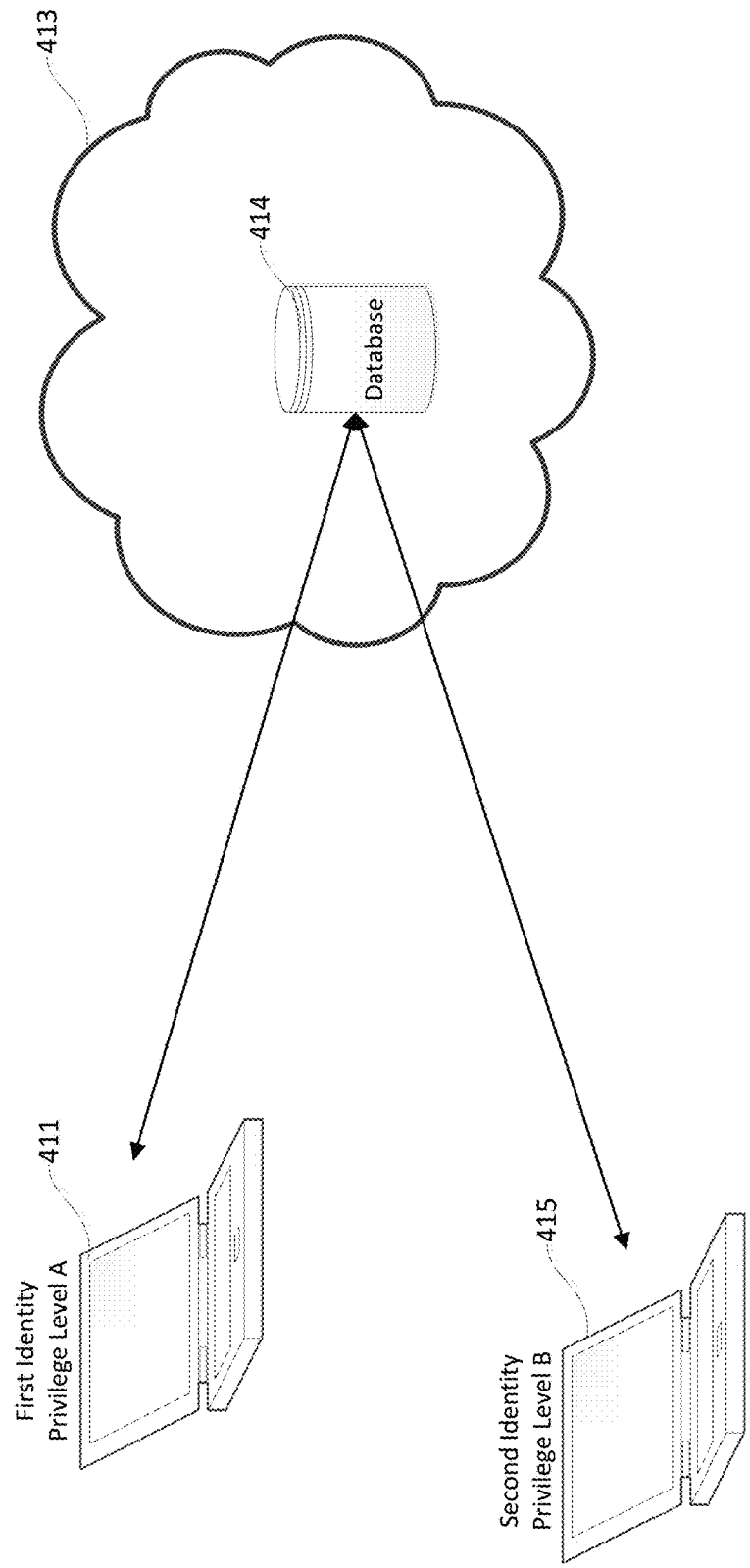
FIG. 4C is a block diagram of an exemplary system including identities with the different privilege levels connecting to a network resource, in accordance with disclosed embodiments.

FIG. 4C illustrates an exemplary system of identities connecting to a network resource. Similar to FIG. 4B, FIG. 4C includes first identity 411 connecting to network resource, database 414, over network 413. As described above, first identity 411 may have some level of privileged access (i.e., privilege level A). In contrast to FIG. 4B, however, in FIG. 4C second identity 415 is connecting to database 414 over network 413 and has a different level of privileged access rights (i.e., privilege level B) than first identity 411. As described above, first identity 411 may have higher or lower privileged compared to second identity 415 (e.g., because one identity is a root account, superuser, or member of a privileged access tier to which the other identity does not belong). Accordingly, the network resource, database 414, transforms from a cold spot to a hot spot and is considered a hot spot. In this scenario, there is the possibility that one of identities 411 and 415 will steal or copy privileged access information from the other, and thereby escalate their privileged access rights.

Figure 4D:
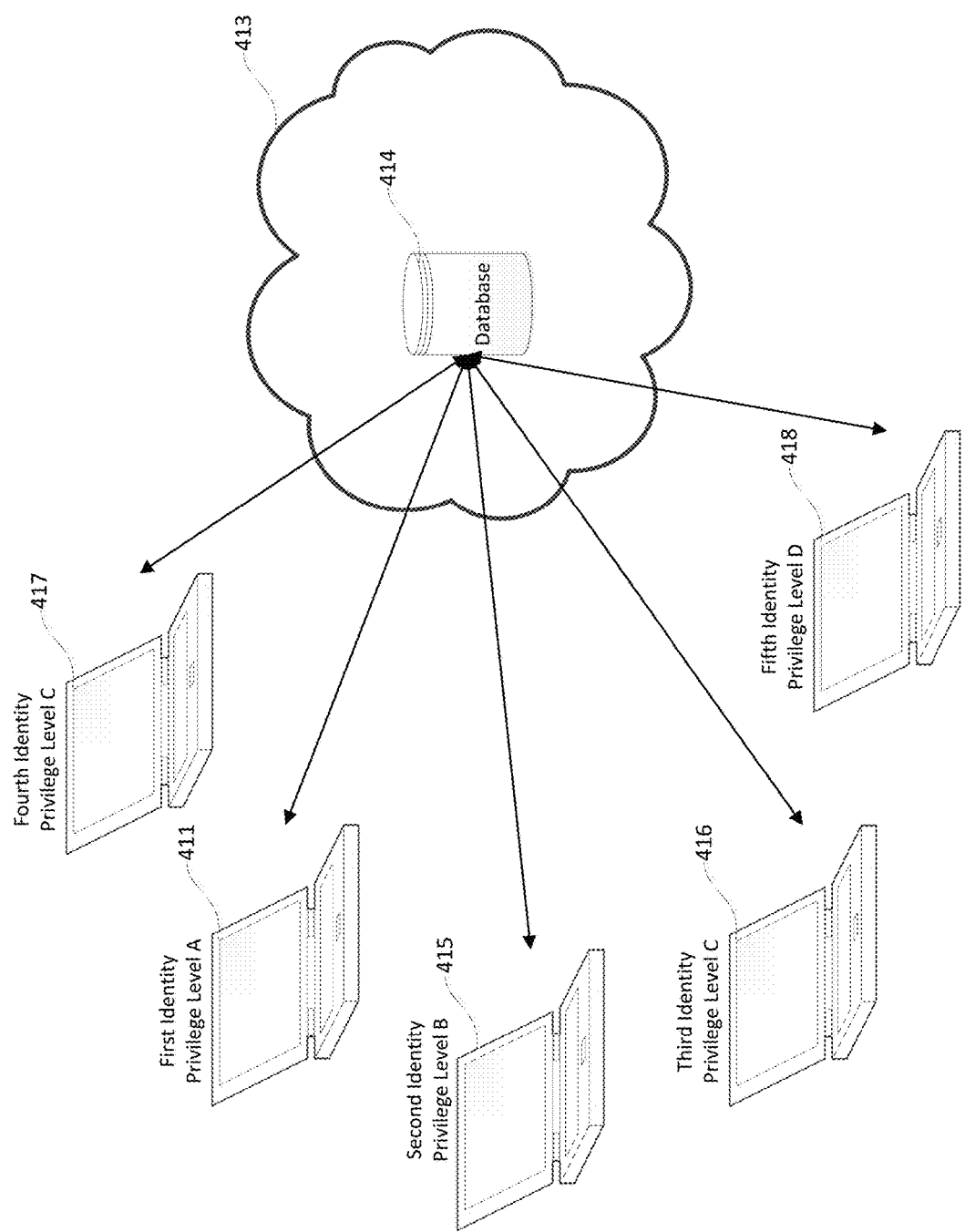
FIG. 4D is a block diagram of an exemplary system including various different identities with some common privilege levels and some different privilege levels connecting to a network resource, in accordance with disclosed embodiments.

FIG. 4D illustrates an exemplary system of many different identities connecting to a network resource. As illustrated, FIG. 4D includes first identity 411 connecting to network resource, database 414, over network 413. First identity has a particular level of privileged access (privilege level A). FIG. 4D further includes second identity 415 (with privilege level B), third identity 416 (with privilege level C), fourth identity 417 (with privilege level C), and fifth identity 418 (with privilege level D) similarly connecting to database 414 over network 413. First identity 411 has a different privilege level from each of the other connected identities 415-418. Indeed, there are four different levels of privileged access among the connected identities. Accordingly, in this instance the network resource, database 414, is a hot spot and is a potential source of privileged access escalation. In this scenario, privileged access escalation vulnerabilities exist between each identity, except as between third identity 416 and fourth identity 417, which have the same level of privileged access (i.e., privilege level C). In some embodiments, as described above, historical logs may be created and maintained (e.g., at database 414 or at an external resource) identifying what identities have connected to the database 414 and other including other identifying information (e.g., their IP addresses, MAC addresses, identity names, privileged credentials, account information, etc.). Using such information, it may be possible to trace how a particular identity was able to escalate its privileges at different times or at different locations in a network. Such information may further reveal other identities that are potentially malicious. For example, in the example of FIG. 4D, if it is confirmed that fourth identity 417 wrongfully escalated its privileged access rights by stealing or copying information from first identity 411, an investigation of network activity may be performed with respect to second identity 415, third identity 416, and fifth identity 418.

Figure 5:
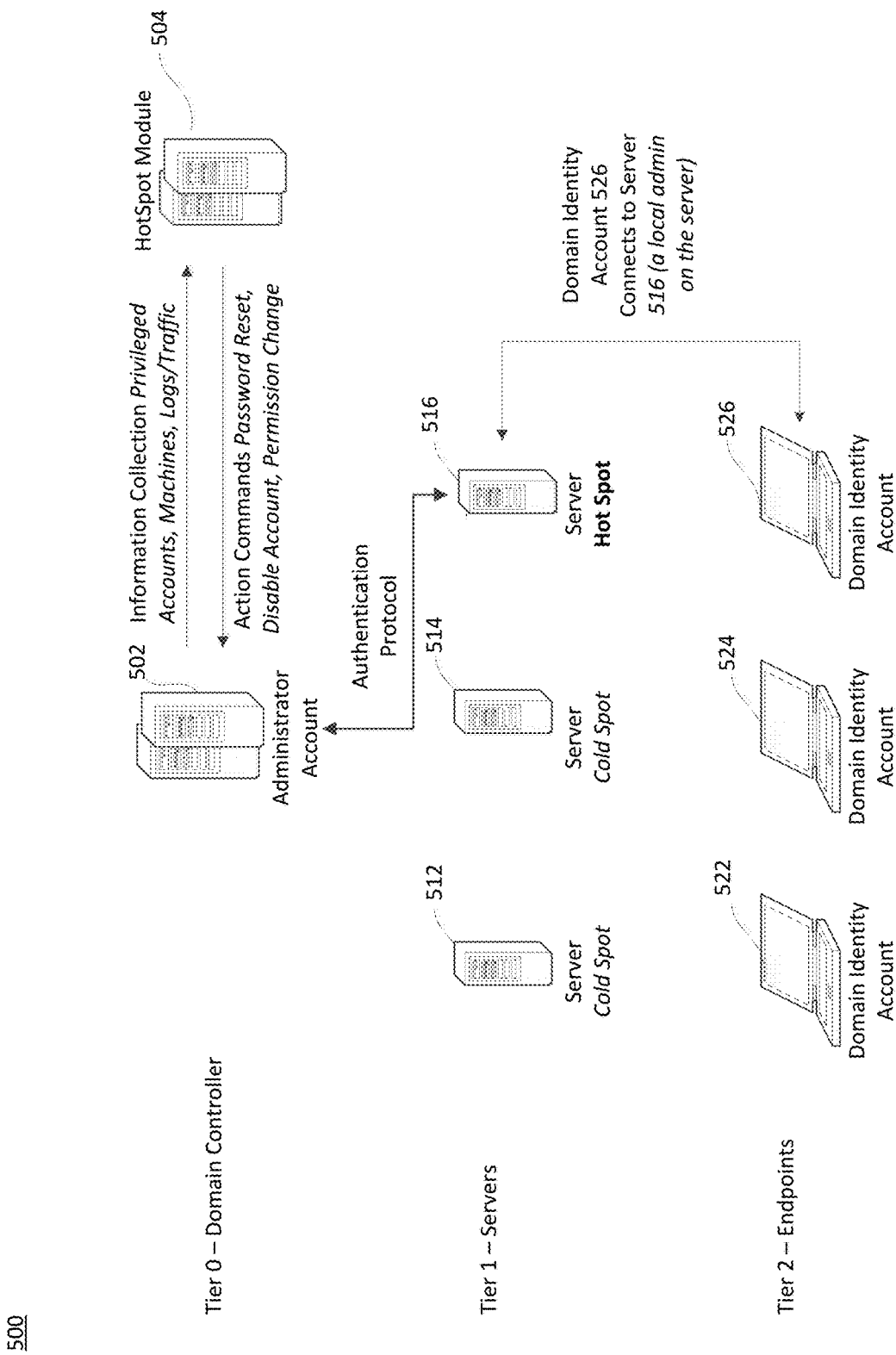
FIG. 5 is a block diagram of an example tiered model system, in accordance with disclosed embodiments.

FIG. 5 is a block diagram of an example tiered model system 500, in accordance with disclosed embodiments. Such a tiered model system 500 may organize or segregate different network resources based on their sensitivity level or the level of privileged access that they have. For example, tiered model system 500 may be based on a Microsoft Active Directory® administrative tier model, or a model corresponding to another operating system.

As illustrated, tier 0 of tiered model system 500 comprises one or more administrator account 502 and one or more hot spot detection machine 504. Tier 0 includes the most sensitive or powerful accounts in the network. Administrator account 502 and hot spot detection machine 504 may communicate via network 110 of FIG. 1 or another network. Administrator account 502 and hot spot detection machine 504 may run on the same machine, same group of machines, or on separate machines.

Hot spot detection machine 504 may allow organizations to track their network for hot spots over time, as described above. As depicted in FIG. 5, in some embodiments, administrator account 502 may provide hot spot detection machine 504 with information it collected, including identifications of privileged identities, machines, and network logs/traffic. In some embodiments, information on privileged identities, machines, and logs/traffic may be collected from each server of tier 1 or each endpoint of tier 2. Hot spot detection machine 504 may further allow organizations to react to hot spots and immediately address the risk they pose by, for example, sending action commands like changing privileged credentials, invalidating privileged credentials, terminating sessions, tracking network activity, or changing privileges/permissions. As depicted in FIG. 5, in some embodiments, hot spot detection machine 504 may send action commands to administrator account 502 or to any of the tier 1 or tier 2 machines.

In yet other embodiments, hot spot detection machine 504 may allow long-term reaction to make sure the exposed hot spots or accounts will not be creating future hot spots. Thus, in such embodiments hot spot detection machine 504 may not immediately take remedial action when a hot spot is detected. It may instead develop a pattern of hot spot activity before deciding that enough hot spot activity has occurred to warrant remedial action.

Tier 1 of tiered model system 500 may include various network resources. As shown, tier 1 includes a variety of different servers, specifically, server cold spot 512, server cold spot 514, and server hot spot 516. Other servers, and other types of network resources (e.g., databases, virtual machines, containers, etc.), are possible in different network configurations as well.

Tier 2 of tiered model system 500 comprises various different endpoints, such as domain identity account 522, domain identity account 524, and domain identity account 526. Domain identity accounts of tier 2 have a different level of privileges than administrator account 502. For example, while administrator account 502 may have administrator privileges throughout the entire network, domain identity accounts 522-526 may have limited privileges (e.g., limited to their own computer, or to a portion of the network) or no privileges at all. Administrator account 502 may communicate with server hot spot 516 of tier 1 by an authentication protocol. By way of example, domain identity account 526 may connect to server hot spot 516. Simultaneously, administrator account 502 may also be communicating with the server 516. For example, administrator account 502 may be performing maintenance on the server 516, may have a remote connection established with server 516, etc. Accordingly, in that instance domain identity account 526 may potentially escalate its privileges to those of administrator account 502 of tier 0 using server hot spot 516 of tier 1 as a hot spot. As discussed above, there are a variety of attack techniques that domain identity account 526 can use to steal or copy privileged access information from administrator account 502 when both are connected to the same server 516. By contrast, servers 512 and 514 would not allow such privilege access escalation. As discussed above, privileged escalation risks occur when there is a mixture of privileges on a given machine (e.g., server hot spot 516), such as permissions or authorization rights.

In some embodiments, server cold spot 512 and server cold spot 514 are cold spots because administrator account 502 is not connected to them. As described above, however, server cold spot 512 and server cold spot 514 could each become hot spots if administrator account 502 (or any other identity with privileged access rights) and a domain identity account 522-524-526 connected to them.

In further embodiments, cold spots may include accounts under a domain administrator group, accounts with privileged control over privileged accounts or groups (accounts with a permission to change password for another privileged account), or accounts with sensitive permissions like password replication permissions.

In additional embodiments, a hot spot may arise from a particular account (rather than a particular network resource or machine). For example, if a particular administrator account is given SharePoint replication privileges, they may have the ability to replicate passwords and other sensitive information regarding any object in a network (e.g., any resource in a Microsoft Active Directory® configuration). By having those replication privileges, the administrator account itself may be deemed a hot spot, because it can escalate privileges using its replication rights.

FIG. 6 depicts an exemplary process 600 for identifying and responding to network resources that have privileged access escalation vulnerabilities. Process 600 may be performed in the environments of systems 100, 200, 300, or 500, as well as variations on such systems or combinations thereof.

Process 600 may include an operation 610 of recognizing a first identity (e.g., user or account) with a first set of privileges. As discussed above, the first identity with a first set of privileges or privileged network access may be, for example, a network administrator or other user with strong privileged access rights. For example, the first user having a first set of privileged network access may be local user account 210, network user account 220, application account 230, or service account 240 as illustrated in FIG. 2. In some embodiments, the first identity may be identified based on a domain administrator group, network tier, etc. Further, the first identity may be identified based on an ability of the first user to change passwords of other users. This ability may be maintained in a list of privileged accounts (e.g., administrator accounts). Further, the first identity may be identified based on an inspection of network application data traffic (e.g., interception of communications, analysis of received communications, etc.), or an inspection of network authentication traffic.

Process 600 may also include an operation 620 of recognizing a network resource that the first identity is connected to. As discussed above, the network resource that the first identity is connected to and communicating with may be a network resource, for example, server 132, database 134, virtual machine 136, or virtual machine container 138 of FIGS. 1-3. In accordance with above embodiments, identifying a network resource that the first identity is communicating with may involve performing a network scan for cold spots. In further embodiments, cold spots may send messages confirming that a first identity is communicating with them and having a certain level of privileged access rights.

Process 600 may also include an operation 630 of categorizing the network resource as a resource to be monitored dynamically. For example, as discussed above in connection with FIG. 4, operation 630 may be similar to operation 410 of determining whether privileged credentials are being used on the network resource. Operation 630, therefore, may involve determining whether the network resource is a cold spot.

Process 600 may also include an operation 640 of monitoring connections activity of the network resource dynamically to identify a second identity, having a second set of privileges different from the first set of privileges and trying to connect with the network resource. In accordance with above embodiments, operation 640 may be similar to operation 430 of FIG. 4, where it is determined whether the network resource is capable of allowing privileged escalation.

Process 600 may also include an operation 650 of categorizing, based on the identification of the second identity, the network resource as a source of privilege escalation risks. As discussed above, operation 650 may be similar to the decision made in operation 430 of FIG. 4, where a determination is made in operation 440 whether the network resource is a hot spot. In different embodiments, the first identity may have stronger or weaker privileges than the second identity. What makes the network resource a hot spot, however, is the fact that the first and second identities have different levels of privileges. In other words, the first identity may be an attacker attempting to obtain privileged access rights of the second identity, or vice versa.

Process 600 may also include an operation 660 of executing, in response to the determination that the network resource is likely to have a privilege escalation issue, at least one of: prompting an alert, carrying out a network security remediation operation, and determining the other identities with sets of privileges from the first set of privileges and that have tried to connect with the network resource. In some embodiments, the plurality of other identities may be identified based on having active connections to the network resource or having attempted to connect to other network resources that are also classified as potential sources of privilege escalation issues. For example, once a hot spot is identified, other identities currently or previously in communication with it may be identified for purposes of tracing additional potentially privileged access escalation vulnerabilities.

In accordance with above embodiments, operation 660 may be similar to operations 450, 460, and 470 of FIG. 4. In different embodiments, one or more of operations 450, 460, and 470 may be performed as part of operation 660. Further, in other embodiments additional actions may be taken based on the classification that the network resource is a potential source of privileged access escalation vulnerabilities.

In some embodiments, the network security remediation operation may include rotating a password associated with at least one of the first identity and the second identity (e.g., using a centralized password resource, a secure network credential vault, etc.), or terminating a network session between the network resource and at least one of the first identity and the second identity. In some embodiments, the processor may be further configured to perform a further network security remediation operation for the plurality of other identities. The further network security remediation operation may be one or more of the types described above.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of the these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for actively identifying identities that have privileged access escalation vulnerabilities, the operations comprising:
    identifying a first identity having a first level of privileged access;
    identifying a second identity having a second level of privileged access that is different from the first level of privileged access;
    based on an identification of the second identity gaining access to the first identity and further based on determining that the first identity and the second identity have different levels of privileged access, classifying the second identity as a potential source of privileged access escalation vulnerabilities; and
    performing, based on the classification that the second identity is a potential source of privileged access escalation vulnerabilities, at least one of:
        triggering an alert regarding the potential source of privileged access escalation vulnerabilities;
        performing a network security remediation operation for at least one of the first identity and the second identity, wherein the network security remediation operation includes at least one of:
            prompting at least one of the first identity and the second identity with an authentication challenge; and
            terminating a network session between the first identity and the second identity; and
        identifying a plurality of other identities with levels of privileged access different from the first level of privileged access and that share a characteristic in common with the second identity.

2. The non-transitory computer readable medium of claim 1, wherein the first identity is at least one of a network resource, a user, a machine, an application, an application instance, a service, a software application, a code element, a source code file or artifact, a repository, or a container.

3. The non-transitory computer readable medium of claim 1, wherein the first identity is identified based on an ability of the first identity to change passwords of other identities.

4. The non-transitory computer readable medium of claim 1, wherein the first identity is identified based on an inspection of network application data traffic.

5. The non-transitory computer readable medium of claim 1, wherein the first identity is identified based on an inspection of network authentication traffic.

6. The non-transitory computer readable medium of claim 1, wherein the network security remediation operation includes rotating a password associated with at least one of the first identity and the second identity.

7. The non-transitory computer readable medium of claim 1, wherein the processor is further configured to perform a further network security remediation operation for the plurality of other identities.

8. The non-transitory computer readable medium of claim 1, wherein the alert identifies the privileged access escalation vulnerabilities.

9. The non-transitory computer readable medium of claim 1, wherein the plurality of other identities are identified based on having active connections in common with the first identity.

10. The non-transitory computer readable medium of claim 1, wherein the plurality of other identities are identified based on having attempted to connect to a network resource to which the second identity has connected.

11. The non-transitory computer readable medium of claim 1, wherein the first level of privileged access and second level of privileged access are based on different network security group memberships.

12. The non-transitory computer readable medium of claim 1, wherein the first level of privileged access and second level of privileged access are based on different network security tiers within a multi-tier network security framework.

13. The non-transitory computer readable medium of claim 1, wherein the second identity is at least one of a network resource, a user, a machine, an application, an application instance, a service, a software application, a code element, a source code file or artifact, a repository, or a container.

14. A computer-implemented method for actively identifying identities that have privileged access escalation vulnerabilities, the method comprising:
    identifying a first identity having a first level of privileged access;
    identifying a second identity having a second level of privileged access that is different from the first level of privileged access;
    based on an identification of the second identity gaining access to the first identity and further based on determining that the first identity and the second identity have different levels of privileged access, classifying the second identity as a potential source of privileged access escalation vulnerabilities; and performing, based on the classification that the second identity is a potential source of privileged access escalation vulnerabilities, at least one of:

triggering an alert regarding the potential source of privileged access escalation vulnerabilities;

performing a network security remediation operation for at least one of the first identity and the second identity, wherein the network security remediation operation includes at least one of:

prompting at least one of the first identity and the second identity with an authentication challenge; and terminating a network session between the first identity and the second identity; and identifying a plurality of other identities with levels of privileged access different from the first level of privileged access and that share a characteristic in common with the second identity.

15. The computer-implemented method of claim 14, wherein the network security remediation operation includes rotating a password associated with at least one of the first identity and the second identity.

16. The computer-implemented method of claim 14, further comprising performing a further network security remediation operation for the plurality of other identities.

17. The computer-implemented method of claim 14, wherein the plurality of other identities are identified based on having attempted to connect to other network resources that are also classified as potential sources of privileged access escalation vulnerabilities.

18. The computer-implemented method of claim 14, wherein the first level of privileged access and second level of privileged access are based on different network security group memberships.

* * * * *